June 2, 1942.　　　K. H. SCHMIDT　　　2,285,097
ELECTRIC RECTIFIER OR CONVERTER
Filed Nov. 13, 1939　　　4 Sheets-Sheet 1

Inventor:
KARL HERMANN SCHMIDT
by Haseltine, Lake & Co.
attys.

June 2, 1942.　　K. H. SCHMIDT　　2,285,097
ELECTRIC RECTIFIER OR CONVERTER
Filed Nov. 13, 1939　　4 Sheets-Sheet 3

Inventor:
KARL HERMANN SCHMIDT
by Haseltine Lake & Co.
attys.

June 2, 1942. K. H. SCHMIDT 2,285,097
ELECTRIC RECTIFIER OR CONVERTER
Filed Nov. 13, 1939 4 Sheets-Sheet 4

Inventor:
KARL HERMANN SCHMIDT
by Haseltine, Lake & Co.
attys.

Patented June 2, 1942

2,285,097

UNITED STATES PATENT OFFICE 2,285,097

ELECTRIC RECTIFIER OR CONVERTER

Karl Hermann Schmidt, London, England

Application November 13, 1939, Serial No. 304,168
In Great Britain November 16, 1938

17 Claims. (Cl. 175—365)

This invention relates to electric rectifiers or converters of the kind capable of transforming direct current or pulsating uni-directional current, to alternating current or vice versa, and is concerned with rectifiers or converters of this kind in which a vibrator system is used for interrupting and/or reverse connecting a primary circuit.

In known rectifiers employing a vibratory system, difficulty is experienced in satisfactorily designing the vibrator for the reason that the vibrator controls a main circuit, that is to say, a circuit carrying a load current rather than a relay current. It therefore becomes necessary to have a rapid make and break with, at the same time, a good contact during the period that the circuit is being closed.

A rectifier or converter in accordance with the invention comprises two pairs of displaceable contact-carrying elements, each pair being controlled from an electro-magnetic device which includes a winding associated with the direct current circuit and a winding associated with the alternating current circuit, each such winding being arranged to influence magnetically a displaceable magnetic armature so that when the electro-magnetic device is in operation the armatures will be alternately attracted to one another, the several armatures directly or indirectly serving to operate the contact-carrying elements in such manner as to produce closing and opening of the circuit or circuits controlled by said elements.

According to a further feature of the invention, the contact-carrying elements are angularly displaceable, their contacting surfaces, when in engagement, meeting substantially in the plane containing the axes about which the said elements are angularly displaceable.

It will be understood that several assemblages each consisting of two pairs of contact-carrying elements with their associated armatures and windings may be embodied in one apparatus.

For a better understanding of the invention reference is now made to the accompanying drawings, in which—

Figure 2:
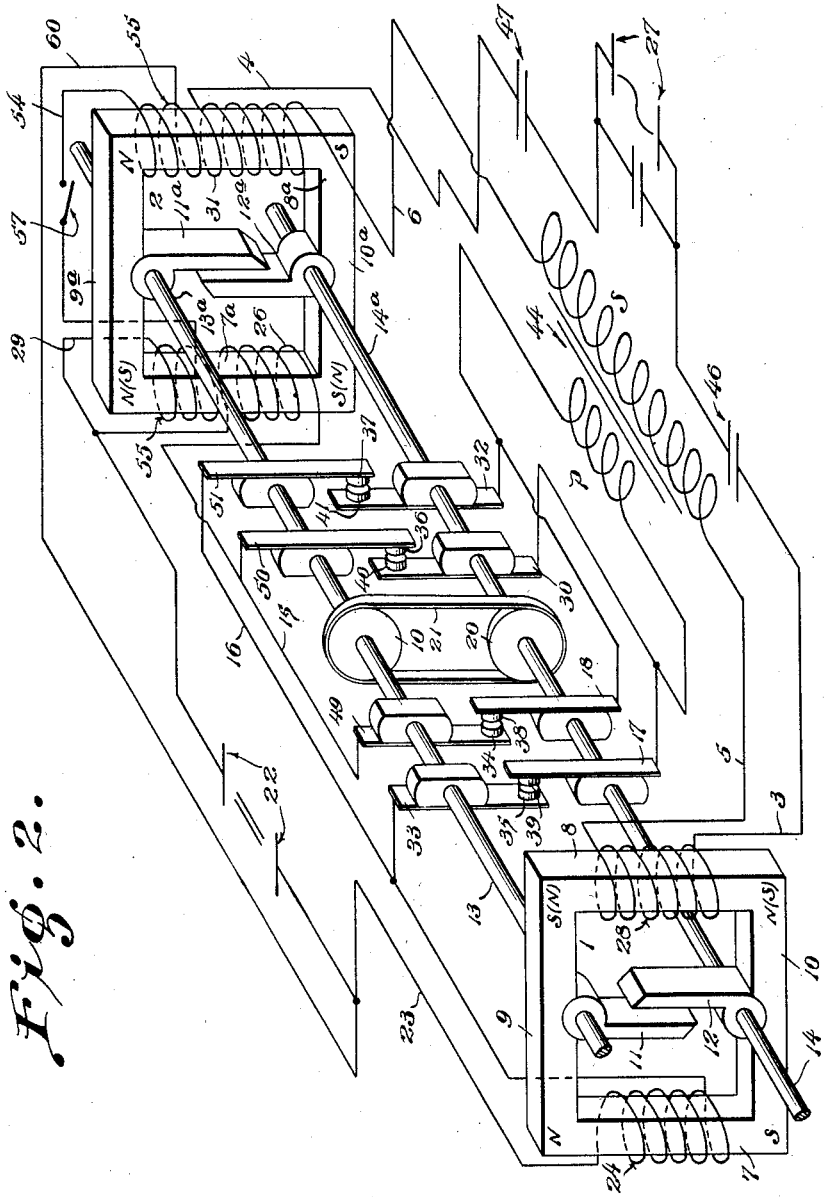
Fig. 2 illustrates substantially the same rectifier converter apparatus with a so-called ammeter connection, as coupled into different exterior circuits, also intended for changing direct current into alternating current.
Figure 3:
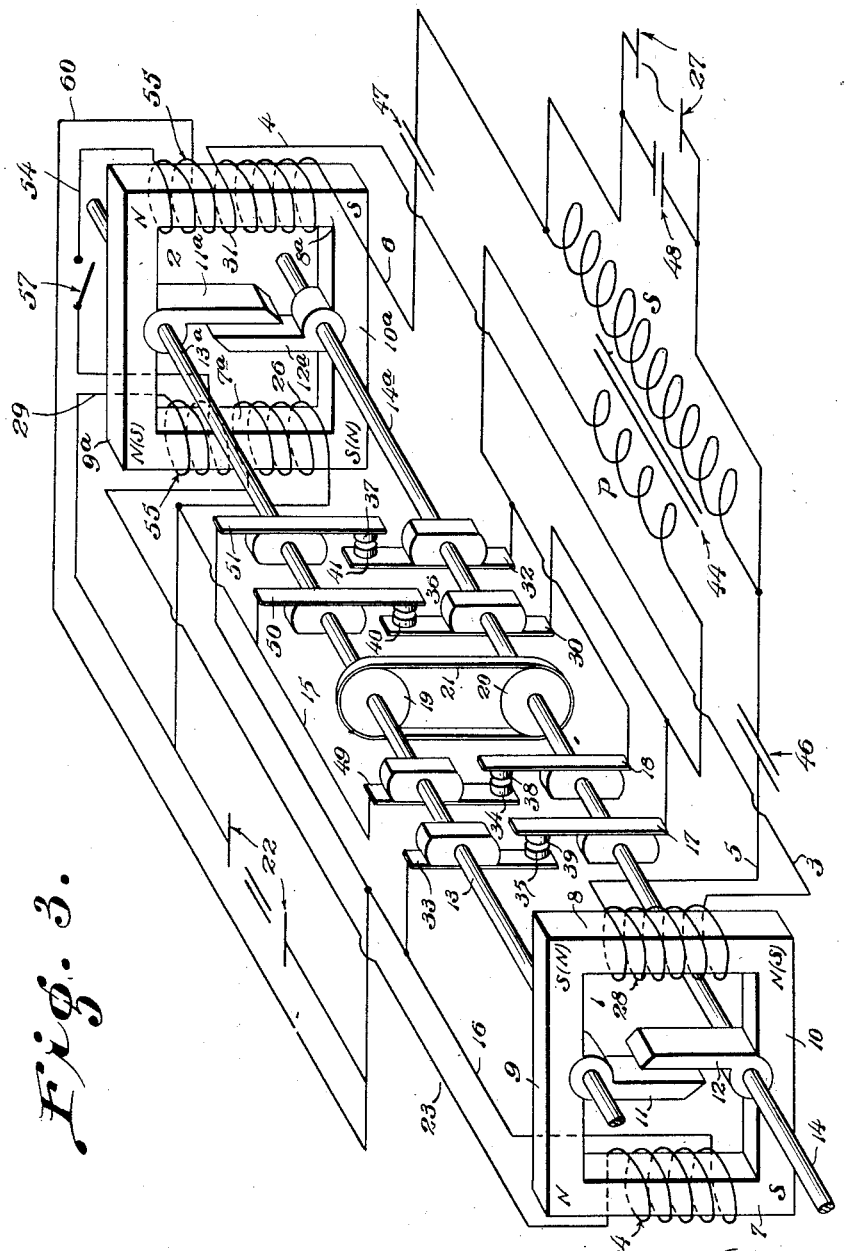

Fig. 3 also shows the same apparatus with a so-called voltmeter connection and otherwise having similar circuits as in Fig. 2, and likewise intended for converting direct current into alternating current.

Finally, Fig. 4 again shows the apparatus with a further exterior circuit arrangement for converting alternating current into direct current.

Throughout the views, the same references indicate the same or like parts.

In a preferred form of my invention as illustrated in the figures of the drawings, it will readily be seen that the assembly consists of two similarly constructed and inter-connected units 1 and 2. The unit 1 has two windings 24 and 28, the winding 24 being connected through line 23 to the direct current supply (or output) leads 22, and the winding 28 through line 3 to the alternating current output (or supply) leads 27. The cores 7 and 8 of the windings are arranged adjacent to one another with their axes parallel and are connected to pole pieces 9 and 10 so as to form a kind of yoke or frame which serves to accommodate two magnetic armatures 11 and 12. The armature 11 is associated with the pole piece 9 and the other armature 12 with the pole piece 10, so that each armature is magnetised by induction from its respective pole piece when current flows. The armatures are carried on shafts 13, 13a and 14, 14a which are angularly movable, and the windings are so directed that when both are energised then periodically their polarity will be similar and periodically it will be different, depending upon the particular phase obtaining in the alternating current connection at the time, as indicated by the magnetic symbols N and S. Hence when the electro-magnetic device is operating, the armatures 11 and 12 tend alternately to repel and attract one another. The shafts 13 and 14 will thus be partly rotated in directions corresponding to the movement of the armatures. Suitable stops (not shown) may be provided to limit the movement of the armatures away from one another, these stops being adjustable if desired.

At a convenient point on the shaft 13, there are secured a pair of contact carrying elements in the form of contact arms 17 and 18 carrying contact heads 39, 38 at their free ends. Similar arms 33, 49 having contact heads 35, 34 are secured to the shaft 14. The contact arms 17 and 33, and also 18 and 49 extend towards one another so that the contact heads 39 and 35, on the one hand, and 38 and 34 lie opposite one another. One contact arm is connected in the direct current side while the other is connected in the alternating current side so that the two together form an interruptor whereof the contact heads are normally separated. When the armatures 11 and 12 are mutually attracted, the two contact heads 39 and 35, as one pair, and 38 and 34 as the other pair come together, while when the armatures are separated (in a manner to be hereinafter described), these contact heads are separated. The contact arms 17, 18, 33 and 49 are in the form of spring blades or leaf springs which absorb any excessive movement imparted to them in their closing movement by the armatures 11 and 12. It will be observed, moreover, that the contact arms are so positioned that their contact heads are adapted to engage with one another in a plane containing, or substantially containing, the axes of the shafts 13 and 14, so that even if the spring blades constituting the arms are deformed by the continued angular movement of their carrying shafts after the contact heads have met, then the contact heads will still preserve a comparatively great area of contact where the contact pressure is substantially uniform. This is an important feature where a relatively heavy current is being dealt with.

The shafts 13 and 14 carry pulleys 19 and 20 around which passes a belt or cord 21, the arrangement being such that when one of the contact arms is moved in either of its two directions, the appropriate corresponding movement will be conveyed from it to the other arm. This ensures that there shall be a quick make-and-break between the contact heads, and it further ensures the application of uniform contact pressure to which reference has already been made. It will be understood that the pulley and belt may be replaced by other means to ensure synchronous movement, such as a toothed wheel on one shaft meshing with a toothed wheel of equal pitch on the other shaft.

By reason of the fact that both the contact arms in each unit move towards and away from one another, the speed of the make-and-break between the contacts will be double that which would obtain were only either pair of contact arms movable and the other stationary.

The unit 2 is constructed in much the same way as the unit 1, save that the relative positions of the armatures and contact arms are reversed. Since the actual parts employed in the unit 2 are a replica of those employed in the unit 1, these parts are, for simplicity and avoidance of repetition, identified by the addition of the reference letter $a$ to the reference numerals applied to parts associated with the unit 1, except as to the various leads of the coils on said units, which are substantially the same in the several views.

In the case of the unit 2, the direct current coil 31 and the alternating current coil 26 as well as the armatures and their associated control arms are so arranged in comparison with the corresponding coils of the unit 1, that when current is applied to the complete sytem, one pair of armatures will be attracted to close their associated contact heads, while the other pair of armatures will be separated to open their associated contact heads and so on.

In actual construction the two units shall be so situated relatively to one another, that the shafts 13, 13a and 14, 14a, shall form parts of only two shafts. It follows from this that when, say, the armature 11 moves towards its complementary armature 12 under magnetic attraction to close the associated contact heads 39 and 35, the consequent rotation of the shaft 13 will cause the armature 11a to move away from its complementary armature 12a thereby opening the contact of the associated contact heads 38 and 34.

It will be understood that an apparatus may be constructed having only one assemblage similar to unit 1 with its parts, or even three or more, although two are shown. When armatures 11 and 12 mutually approach the contacts 35 and 39 close simultaneously with the mutual closure or contact heads 34 and 38, but as further contact arms 30 and 32 are mounted on shaft 14, 14a with contact heads 40 and 41 and also further contact arms 50 and 51 are mounted on shaft 13, 13a with contact heads 36 and 37 opposed to contact heads 40 and 41 of the first named arms, these last contact heads will be separated by such movement of the armatures. However, whenever armatures 11a and 12a of unit 2 are mutually attracted then contact heads 35 and 39 as well as 34 and 38 will separate, while contact heads 40 and 36 will close and also heads 41 and 37, the various circuits to which the contact arms are connected being described hereinafter.

Figure 4:
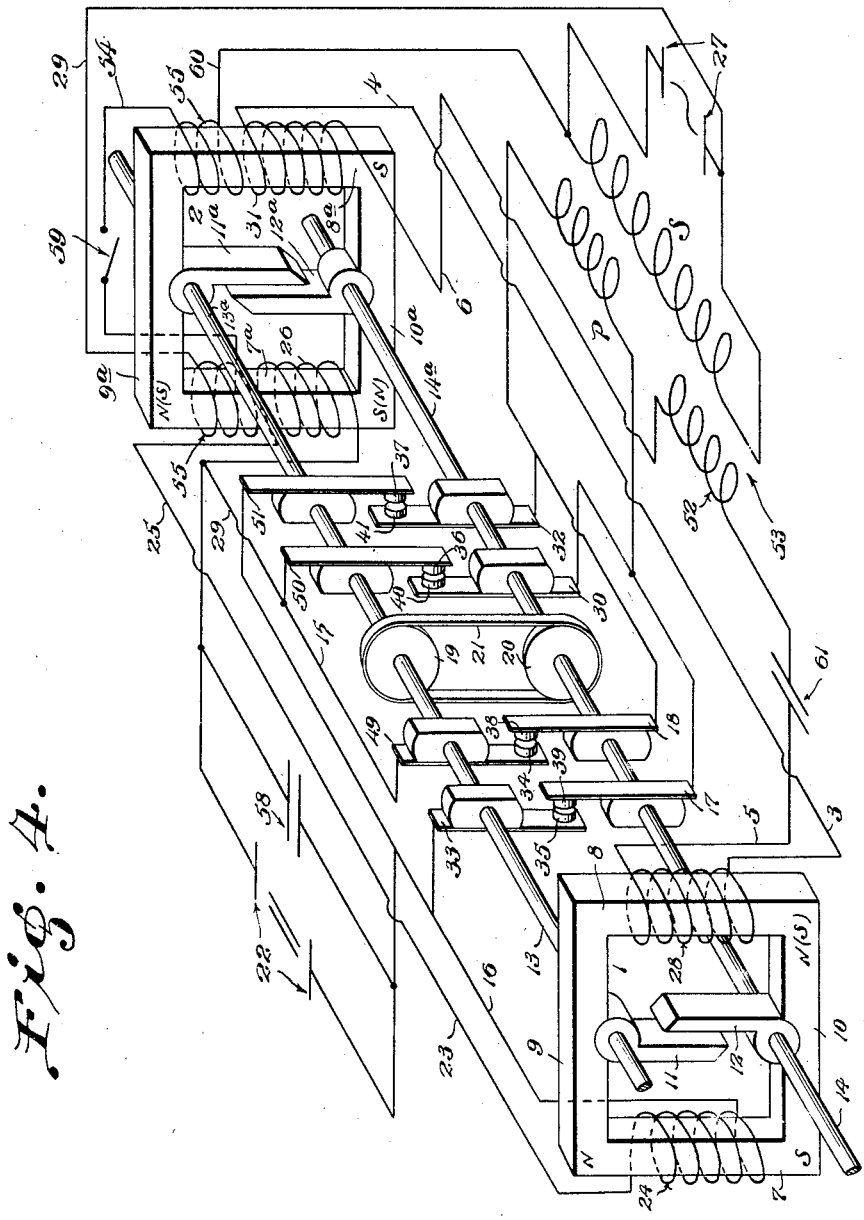

It may be assumed that the first three circuit diagrams illustrated are each for use in a system for converting direct current into alternating current so that the leads 22 are for direct current input and the leads 27 for alternating current output, while in the system of Fig. 4, the ensemble is intended for converting alternating current into direct current.

Figure 1:
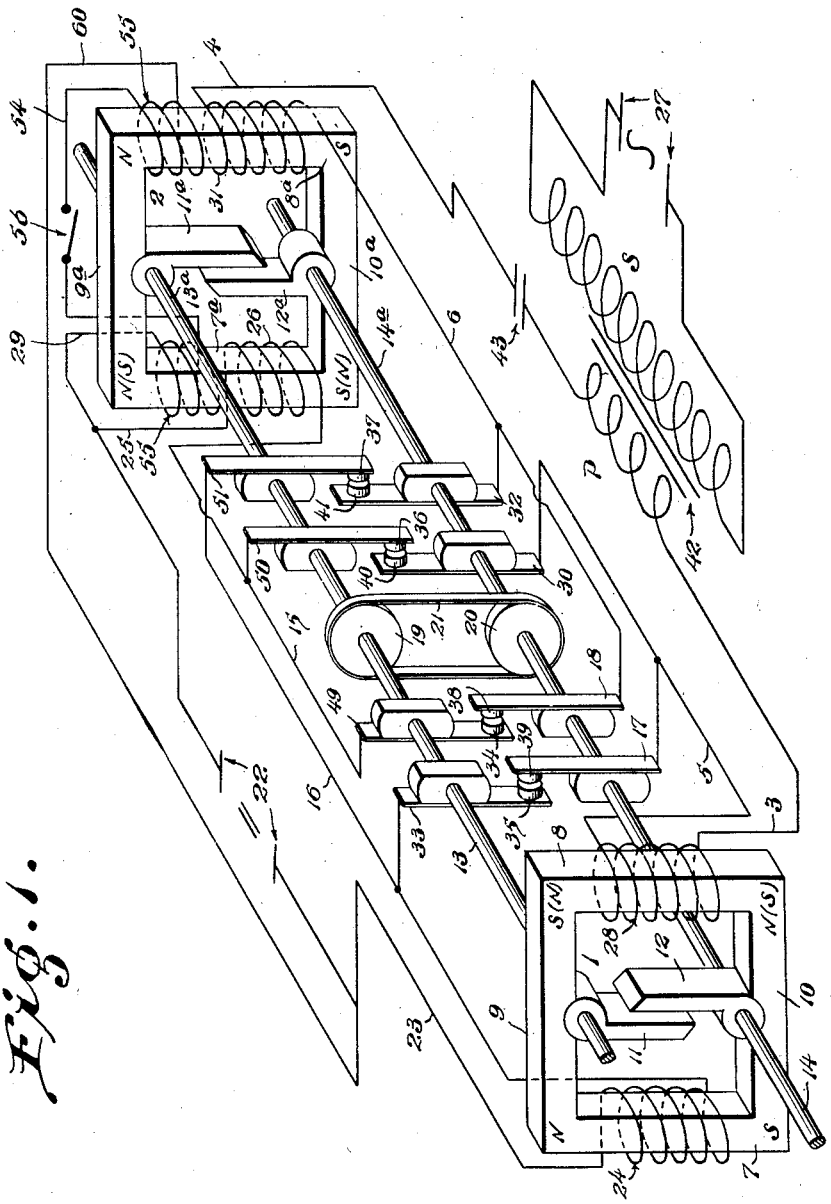
Figure 1 is a plan view showing diagrammatically and in partial perspective, a rectifier converter system having two cooperating rectifier converters with their magnets, coils and circuits, intended for converting direct current into alternating current.

In the circuit diagram according to Figure 1, the windings 28 and 31 on the alternating current side of units 1 and 2, are connected by leads 3 and 4 to the primary P of a transformer 42 so that the alternating current output is through the secondary S of the transformer. The primary connections include a condenser 43.

The lead 6 of coil 31 connects with contact arms 18 and 32, so that current may flow from said coil through contact arm 32 to contact arm 51 and lead to coil 24 of unit 1 whose other lead connects with the direct current supply 22. The lead 23 also connects through a lead 60 with starting coils 55 on cores 7a and 8a of unit 2, which connect with the same direct current supply 22 by means of lead 29, while lead 54 interconnect said coils past a starting switch or impulse contact 56. Coils 55 are virtually in series with coil 26 by lead 25 and by lead 60 with coil 24 through lead 23, and the latter may connect in series with coil 28 or coil 31 through 33 and 17 on the one hand, and through 37 and 41, on the other hand, depending on which pair of armatures is mutually attracted. Coil 26 will be connected in series by contacts 49 and 50 through lead 15 and 17 and 30 either with coil 28 or with coil 31 of units 1 and 2.

In Figure 2, the windings 28 and 31 on the alternating current side are connected to the secondary S of a transformer 44 by means of a series connection with the load thereon, the primary P of the transformer receiving the initially converted current from contacts 17, 18, 30 and 32, while the secondary s is connected at one end through lead 5 to coil 28 and through lead 6 at the other end to coil 31, while the other ends of these coils are connected through condensers 46 and 47 to the alternating supply 27, while a smoothing condenser 48 is interposed between the two branches 3 and 4. In other respects the circuit diagram and the mechanical operation, etc., are as set forth in connection with Figure 1. In Figure 3 lead 23 directly connects coil 24 with coil 26 while the other ends of said coils are connected to the direct coil supply 22, the leads 16 of coil 24 connecting with the coils 55 through lead 60. In this figure as well as in Figure 2 the starting switch 57 corresponds to the starting switch 56 of Figure 1.

However, the primary P of the transformer 44 is connected to the contacts 17 and 30 at one end and 18 and 32 at the other end, while the secondary s is connected to the coil 31 through lead 6 past condenser 47, and coil 28 through lead 5 past condenser 46, while the other lead 4 of coil 31 connects directly to lead 3 of coil 28. The ends of the secondary s are connected to the alternating current supply while the smoothing condenser 48 bridges the connections to improve the wave form.

In Figure 4, the windings on the alternating current side are connected through leads 5 and 6 to an auxiliary secondary coil 52 provided specifically for the purpose in the transformer 53, a condenser 61 being employed in the circuit including said auxiliary coil.

The secondary s is connected to the leads 27 of the alternating current supply while lead 29 of coil 55 on core 7a connects to one end of said secondary. While the magnet coils in Figure 3 are in parallel connection on both sides in this form the coils on the alternating current side are parallel with the load and across the load a large smoothing condenser 58 is placed between leads 16 and 25 which connect with coils 24 and 26 respectively. In this case the starting switch 59 corresponds to the starting switch 56 of Figure 1. In this form the purpose of the device is to produce direct current from alternating current and hence the contrast in the circuit and the three coils of the transformer used.

It will be understood that if the alternating current side according to Figures 3 to 5 is used as the input by the supply of alternating current thereto, the direct current side will provide the output and will deliver pulsating unidirectional current.

In all the forms of circuits the device is not self-starting and switch 56, 57 or 59 is inserted for this purpose.

What I claim and desire to secure by Letters Patent of the United States is:

1. A rectifier or converter capable of transforming direct current or pulsating uni-directional current into alternating current or vice versa, comprising two pairs of displaceable contact-carrying elements, each pair being controlled from an electro-magnetic device which includes a winding associated with the direct current circuit and a winding associated with the alternating current circuit, each such winding being arranged to influence magnetically a displaceable magnetic armature so that when the electro-magnetic device is in operation such armatures will be attracted to one another, the several armatures directly or indirectly serving to operate the contact-carrying elements in such manner as to produce closing and opening of the circuit or circuits controlled by said elements.

2. A rectifier or converter according to claim 1, wherein the contact-carrying elements are angularly displaceable, their contacting surfaces, when in engagement, meeting substantially in the plane containing the axes about which the said elements are angularly displaceable.

3. A rectifier or converter according to claim 1, wherein each contact-carrying element comprises a resilient arm.

4. A rectifier or converter according to claim 1, having a plurality of units each consisting of two pairs of contact-carrying elements with the armatures and windings being associated therewith.

5. A rectifier or converter according to claim 1, wherein the connections are such that, when current is applied to the electromagnetic devices, one pair of armatures will be attracted to close their associated contact-carrying elements, while the other pair of armatures will be separated to open their associated contact-carrying elements.

6. A rectifier or converter according to claim 1, having a plurality of units each consisting of two pairs of contact-carrying elements with their associated armatures and windings, and having two unit groups so connected together that in one group the contact-carrying elements are closed or in the process of being closed, while in the other group the contact-carrying elements are correspondingly open or in the process of being opened.

7. A rectifier or converter according to claim 1, having a plurality of units each consisting of two pairs of contact-carrying elements with their associated armatures and windings, and wherein the alternating current is delivered or applied through the secondary of a transformer, the primary of which includes a condenser.

8. A rectifier or converter according to claim 1, having a plurality of units each consisting of two pairs of contact-carrying elements with their associated armatures and windings, and wherein the windings on the alternating current side are connected to the secondary of a transformer by means of a parallel (or series) connection with the load thereon, the primary of the transformer receiving the initially converted current.

9. A rectifier or converter according to claim 1, having a plurality of units each consisting of two pairs of contact-carrying elements with their associated armatures and windings, and wherein the windings on the alternating current side are connected to an auxiliary secondary coil in a transformer, a condenser being employed in the circuit including said secondary coil.

10. A rectifier or converter according to claim 1, having means for starting the operation of the rectifier or converter when at rest.

11. A rectifier or converter according to claim 1, wherein the contact-carrying elements are angularly displaceable, their contacting surfaces, when in engagement, meeting substantially in the plane containing the axes about which the said elements are angularly displaceable, and wherein each contact-carrying element comprises a resilient arm.

12. A rectifier or converter according to claim 1, wherein the contact-carrying elements are angularly displaceable, their contacting surfaces, when in engagement, meeting substantially in the plane containing the axes about which the said elements are angularly displaceable, and having a plurality of units each consisting of two pairs of contact-carrying elements with the armatures and windings being associated therewith.

13. A rectifier or converter according to claim 1, having two unit groups so connected together that in one group the contact-carrying elements are closed or in the process of being closed, while in the other group the contact-carrying elements are correspondingly open or in the process of being opened, and also having a plurality of units each consisting of two pairs of contact-carrying elements with the armatures and windings being associated therewith.

14. A rectifier or converter according to claim 1, wherein the alternating current is delivered or applied through the secondary of a transformer, the primary of which includes a condenser, and having two unit groups so connected together that in one group the contact-carrying elements are closed or in the process of being closed, while in the other group the contact-carrying elements are correspondingly open or in the process of being opened, and also having a plurality of units each consisting of two pairs of contact-carrying elements with the armatures and windings being associated therewith.

15. A rectifier or converter according to claim 1, wherein the windings on the alternating current side are connected to the secondary of a transformer by means of a parallel (or series) connection with the load thereon, the primary of the transformer receiving the initially converted current, and having two unit groups so connected together that in one group the contact-carrying elements are closed or in the process of being closed, while in the other group the contact-carrying elements are correspondingly open or in the process of being opened, and also having a plurality of units each consisting of two pairs of contact-carrying elements with the armatures and windings being associated therewith.

16. A rectifier or converter according to claim 1, wherein the windings on the alternating current side are connected to an auxiliary secondary coil in a transformer, a condenser being employed in the circuit including said secondary coil, and having two unit groups so connected together that in one group the contact-carrying elements are closed or in the process of being closed, while in the other group the contact-carrying elements are correspondingly open or in the process of being opened, and also having a plurality of units each consisting of two pairs of contact-carrying elements with the armatures and windings being associated therewith.

17. A rectifier or converter according to claim 1, having two unit groups so connected together that in one group the contact-carrying elements are closed or in the process of being closed, while in the other group the contact-carrying elements are correspondingly open or in the process of being opened, and having a plurality of units each consisting of two pairs of contact-carrying elements with the armatures and windings being associated therewith, and also including means for starting the rectifier or converter when at rest.

KARL HERMANN SCHMIDT.